W. V. TURNER.
ELECTROPNEUMATIC BRAKE.
APPLICATION FILED MAR. 20, 1905.
902,184.
Patented Oct. 27, 1908.
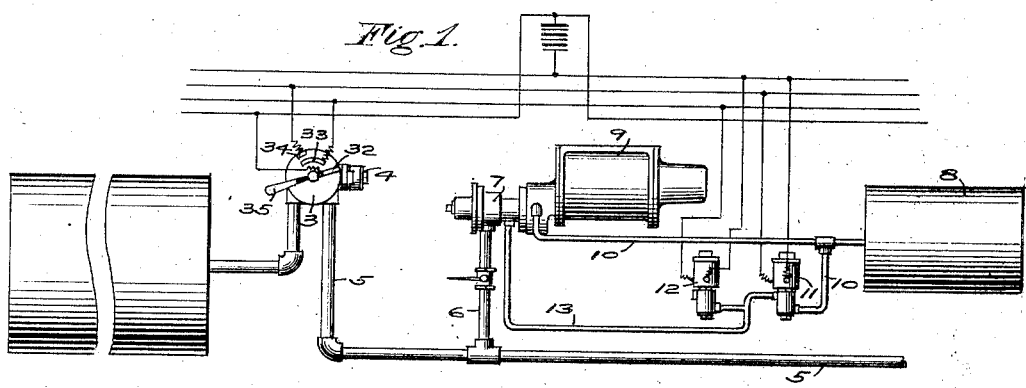
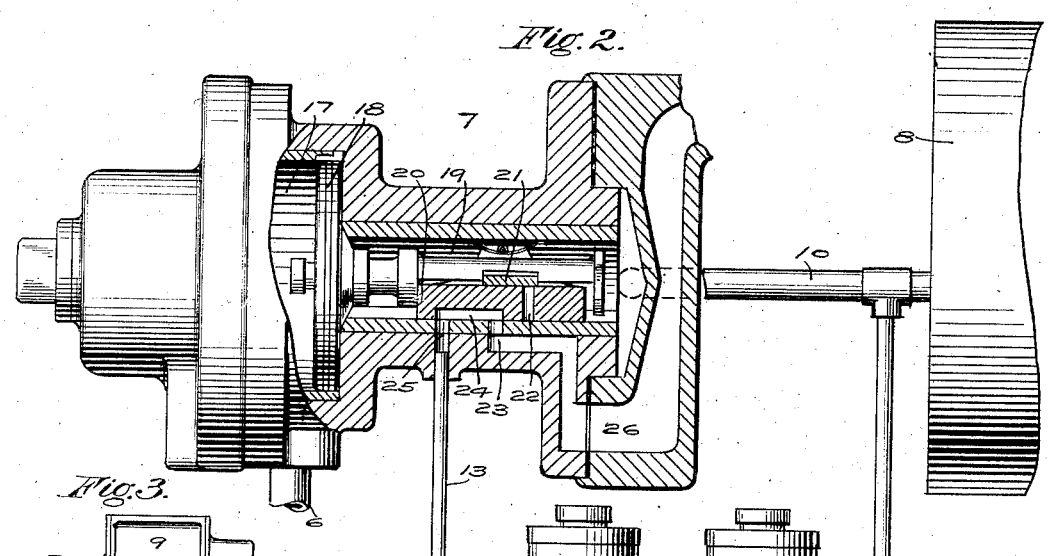
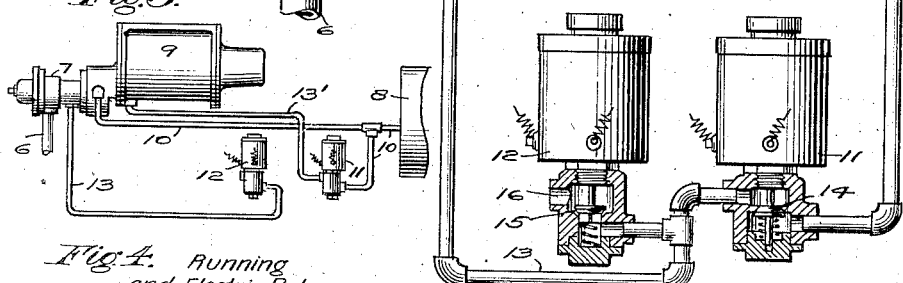
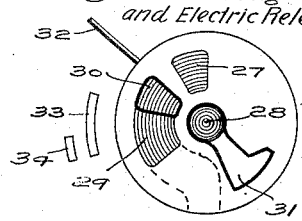
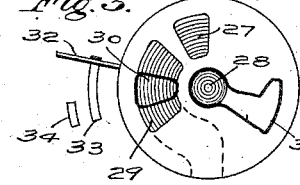
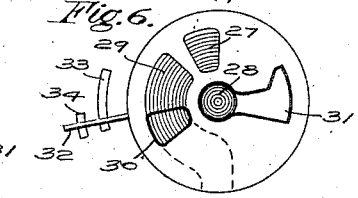
WITNESSES
INVENTOR
Walter V. Turner
by E. Wright
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

ELECTROPNEUMATIC BRAKE.

No. 902,184.  Specification of Letters Patent.  Patented Oct. 27, 1908.

Application filed March 20, 1905. Serial No. 250,969.

*To all whom it may concern:*

Be it known that I, WALTER V. TURNER, a citizen of the United States, residing at Wilkinsburg, in the county of Allegheny and State of Pennsylvania, have invented a certain new and useful Improvement in Electropneumatic Brakes, of which the following is a specification.

This invention relates to automatic fluid pressure brakes for railway cars, and has for its principal object to provide additional electrically operated valve devices which are adapted to be applied to the standard automatic fluid pressure brake apparatus, whereby the brakes may be operated either electrically or pneumatically.

Another object is to provide means for supplying air under pressure to the auxiliary reservoir at the time that the brake is applied by the electrically operated valve device, and thereby maintain the auxiliary reservoir constantly charged nearly to its normal maximum degree of pressure in readiness for a pneumatic or emergency application at any time.

My invention comprises, in addition to the usual standard automatic brake apparatus including a train pipe, auxiliary reservoir, triple valve and brake cylinder, electrically operated valves for controlling the supply of air to the brake cylinder and the release therefrom, the release magnet valve being arranged to control the release through the exhaust port of the triple valve and preferably energized to close said exhaust when the brake is applied electrically. The triple valve is to remain in release position during the electrical operation of the brakes and the air which is supplied by the application magnet valve may be taken to the brake cylinder either directly or through the triple valve exhaust port.

Another feature of my invention comprises means for supplying air to the auxiliary reservoir to maintain the pressure therein at the time of the electric application, in which air is drawn from the auxiliary reservoir to the brake cylinder, and according to the preferred construction the motorman's brake valve is provided with a port for supplying air from the main reservoir through the feed valve to the train pipe and thence through the usual feed groove of the triple valve to the auxiliary reservoir in the electric application and lap positions of the brake valve, the movement of which may also operate the circuit connections of the magnet valves.

In the accompanying drawing, Figure 1 is a diagrammatic view of a brake apparatus embodying my improvements; Fig. 2 a view partly in elevation and partly in vertical section showing the auxiliary reservoir and triple valve device with the electrically operated valve mechanism connected thereto; Fig. 3 a diagrammatic elevation showing a slightly modified form of connection; Fig. 4 a diagram in plan, showing the relative position of the ports and switch contact points in the running and electric release position of the motorman's brake valve, the ports in the valve seat being indicated in light lines and the ports of the rotary valve in heavy lines; and Figs. 5 and 6 similar diagrams illustrating the electric lap position and the electric application position, respectively, of the brake valve.

As shown in Fig. 1, the invention is illustrated as applied to a car or vehicle having a main reservoir 1, main reservoir pipe 2 leading to the motorman's brake valve 3 having feed valve device 4, train pipe 5, branch pipe 6, triple valve device 7 connected by pipe 10 with auxiliary reservoir 8, and brake cylinder 9, all of which may be of the usual standard construction.

The triple valve device, as shown in Fig. 2, is of the ordinary type, comprising piston chamber 17, piston 18, valve chamber 19, main slide valve 20, and graduating valve 21, service port 22, exhaust cavity 24, brake cylinder port 23 and passage 26 and exhaust port 25. In addition to this standard apparatus, I provide an electrically operated valve mechanism comprising application magnet 11 operating the valve 14 for controlling communication from the auxiliary reservoir to the brake cylinder, either through pipe 13 and the exhaust port of the triple valve, as indicated in Fig. 2, or directly through pipe 13', as shown in Fig. 3, and release magnet 12 operating valve 15 for controlling the outlet from the brake cylinder through the exhaust port 25 and pipe 13 to the atmosphere through port 16. When the magnets are not energized the valve 14 is normally closed and the valve 15 normally open so that the brakes may be applied and released pneumatically in the usual way. The switch contact points for controlling the circuits to the magnet valves are preferably mounted on the motorman's brake valve 3, and are operated by the movement of the brake valve handle 35. As shown in Fig. 1 the contact bar 32 which moves with the brake valve handle is connected with one pole of a battery, or other source of current, while the stationary contact points 33 and 34 are connected in the circuits leading to the release valve magnet and the application valve magnet respectively. The point 33 is made longer than the point 34, so that the bar 32 makes contact with both points 33 and 34 in electric application position, but contacts only with point 33 in electric lap position.

In the brake valve seat are located the port 27 leading to the train pipe, exhaust port 28 communicating with the atmosphere, and port 29 leading to the feed valve device 4 and thence to the train pipe in the ordinary way, with the exception that the opening to this port in the seat is made somewhat longer than usual. The rotary valve is provided with a through port 30 adapted to register with either the train pipe port 27 in full release position or with port 29 leading to the feed valve in pneumatic running and all electric positions, and a cavity 31 for connecting the train pipe port 27 with the exhaust port 28 in the pneumatic service and emergency positions in the usual manner.

With the brake valve handle in running position, which is also electric release position, as indicated in Figs. 1 and 4, air under pressure from the main reservoir flows through ports 30 and 29, through the feed valve to the train pipe; and thence through the usual feed groove of the triple valve device to the auxiliary reservoir, charging the same to the normal maximum degree of pressure. To apply the brake electrically the brake valve is turned to electric application position, Fig. 6, in which the contact bar 32 engages both contact points 33 and 34, thereby closing the circuits and energizing both magnets 11 and 12, which operate to close the exhaust valve 15 and open the application valve 14. Air under pressure from the auxiliary reservoir then flows to the brake cylinder, and when the desired braking pressure is attained the brake valve handle is turned back to electric lap position, Fig. 5, in which the circuit to the application magnet 11 is broken, thereby closing valve 14, but the contact bar 32 still engages bar 33, thus maintaining the magnet 12 energized to hold the exhaust valve 15 closed. By turning the brake valve to running position, Fig. 4, the circuit to magnet 12 is opened, whereupon the valve 15 opens to permit the exhaust from the brake cylinder to the atmosphere. The release may be checked at any time by turning the handle to lap position. In this manner the brake cylinder pressure may be graded up or down, at will. It will be noticed that in all the electric positions of the brake valve that the feed port is open through the feed valve to the train pipe and, as the electric application valve draws from the auxiliary reservoir to supply the brake cylinder, air flows from the main reservoir to the train pipe and through the feed groove of the triple valve to the auxiliary reservoir, thereby holding the triple valve in release position and maintaining the auxilairy reservoir constantly recharged.

In case of failure of the electric current at any time, the brakes may be controlled pneumatically in the usual way, the service position of the brake valve in which the small extension of cavity 31 registers with train pipe port 27 being beyond the electric positions, as is also pneumatic lap position, in which all ports are closed. For an emergency application the brake valve is turned to its extreme position, in which the full cavity 31 registers with port 27, thereby opening a large vent from the train pipe through the exhaust port 28 to the atmosphere for making a sudden reduction in train pipe pressure in the ordinary way.

From the foregoing description, it will be apparent that I have provided a simple and efficient device, which may be readily applied to a standard automatic air brake equipment, whereby the brakes may be controlled either electrically or pneumatically, thereby securing the advantage of the quicker action and greater flexibility of the electric system, while at the same time retaining the advantages of the automatic action and certainty of operation of the pneumatic system.

Having now described my invention, what I claim as new and desire to secure by Letters Patent is:—

1. In a fluid pressure brake, the combination with a train pipe, reservoir, brake cylinder, and a pneumatically operated valve device having an exhaust port, of an electric application valve for controlling the supply of air to the brake cylinder, and a normally open electric release valve for controlling said exhaust port.

2. In a fluid pressure brake, the combination with a train pipe, auxiliary reservoir, triple valve and brake cylinder, of an application magnet valve for supplying air to the brake cylinder, and a release magnet valve for controlling the exhaust from the triple valve.

3. In a fluid pressure brake, the combination with a train pipe, auxiliary reservoir, triple valve and brake cylinder, of an application magnet valve for supplying air from the auxiliary reservoir to the brake cylinder, and a release magnet valve for controlling the triple valve exhaust port.

4. In a fluid pressure brake, the combination with a train pipe, auxiliary reservoir, triple valve and brake cylinder, of an application magnet valve for supplying air through the triple valve exhaust port to the brake cylinder, and a release magnet valve for controlling the release through the triple valve exhaust port.

5. In a fluid pressure brake, the combination with a train pipe, auxiliary reservoir, triple valve and brake cylinder, of an application magnet valve for controlling the supply of air to the brake cylinder, a release magnet valve for controlling the release from the exhaust port of the triple valve, and means for energizing both magnets at the same time.

6. In a fluid pressure brake, the combination with a train pipe, auxiliary reservoir, triple valve and brake cylinder, of electrically actuated valve mechanism for controlling the supply of air from the auxiliary reservoir to the brake cylinder, a separate electrically operated valve for controlling the release from the brake cylinder through the triple valve exhaust port, and means for supplying air to the auxiliary reservoir when the brakes are applied by the electrically actuated valve mechanism.

7. In a fluid pressure brake, the combination with a train pipe, auxiliary reservoir, triple valve and brake cylinder, of an application magnet valve for controlling the supply of air from the auxiliary reservoir to the brake cylinder, a release magnet valve for controlling the triple valve exhaust port, switch and circuit connections for energizing both magnets simultaneously, and means for supplying air to the auxiliary reservoir when the brake is applied electrically.

8. In a fluid pressure brake, the combination with a train pipe, auxiliary reservoir, triple valve and brake cylinder, of an electrically operated valve for controlling the supply of air from the auxiliary reservoir to the brake cylinder, a separate electrically operated valve for controlling the exhaust from the triple valve, and a brake valve having a switch for controlling said electric application valve and a port for supplying air to the train pipe when the brake is applied electrically.

9. In a fluid pressure brake, the combination with a train pipe, auxiliary reservoir, triple valve and brake cylinder, of an electrically operated valve for controlling the supply of air from the auxiliary reservoir to the brake cylinder, a brake valve for operating the brakes pneumatically, a switch actuated by the movement of the brake valve handle for controlling the electric application valve, and a port in said brake valve for supplying air to the train pipe in electric application and lap positions.

10. In a fluid pressure brake, the combination with a main reservoir and train pipe, of a brake valve for controlling the brakes pneumatically and having an electric application position between the usual running position and the pneumatic service position, and an electrically operated valve for controlling the supply of air from the auxiliary reservoir to the brake cylinder.

11. In a fluid pressure brake, the combination with a main reservoir, train pipe, and electrically operated valve mechanism for controlling the supply of air from the auxiliary reservoir to the brake cylinder, of a brake valve having ports for opening communication from the main reservoir to the train pipe in one position, and from the train pipe to the atmosphere in another position, and electric contacts actuated by the brake valve at an intermediate position for controlling the electrically operated valve.

12. In a fluid pressure brake, the combination with a main reservoir, train pipe auxiliary reservoir, triple valve and brake cylinder, of an electrically operated valve for supplying air from the auxiliary reservoir to the brake cylinder, a brake valve having a port for supplying air from the main reservoir to the train pipe in electric application position, and switch contacts actuated by the movement of the brake valve to this position for controlling the electrically operated valve.

13. In a fluid pressure brake, the combination with a train pipe, reservoir, triple valve, and brake cylinder, of electrically operated valve means for controlling the supply of air to the brake cylinder, and normally open electrically operated release valve mechanism for controlling the triple valve exhaust.

In testimony whereof I have hereunto set my hand.

WALTER V. TURNER.

Witnesses:
R. F. EMERY,
J. B. MACDONALD.